No. 810,168. PATENTED JAN. 16, 1906.
P. MUELLER.
BASIN COCK.
APPLICATION FILED MAY 29, 1905.

Witnesses.
Ina Graham.
Ivy Scheer.

Inventor.
Philip Mueller
by L. P. Graham
his attorney.

UNITED STATES PATENT OFFICE.

PHILIP MUELLER, OF DECATUR, ILLINOIS, ASSIGNOR TO H. MUELLER MANUFACTURING COMPANY, OF DECATUR, ILLINOIS, A CORPORATION OF ILLINOIS.

BASIN-COCK.

No. 810,168.     Specification of Letters Patent.     Patented Jan. 16, 1906.

Application filed May 29, 1905. Serial No. 262,907.

*To all whom it may concern:*

Be it known that I, PHILIP MUELLER, of the city of Decatur, county of Macon, and State of Illinois, have invented certain new and useful Improvements in Basin-Cocks, of which the following is a specification.

The object of this invention is to provide means whereby a basin-cock may be secured to its slab with the spout or nozzle extending in the proper direction regardless of the shape of the hole through the slab, regardless of the accuracy shown in the construction of the opening, and regardless of the formation of the slab immediately surrounding the hole.

The invention is exemplified in the structure hereinafter described, and it is defined in the appended claims.

Figure 1:
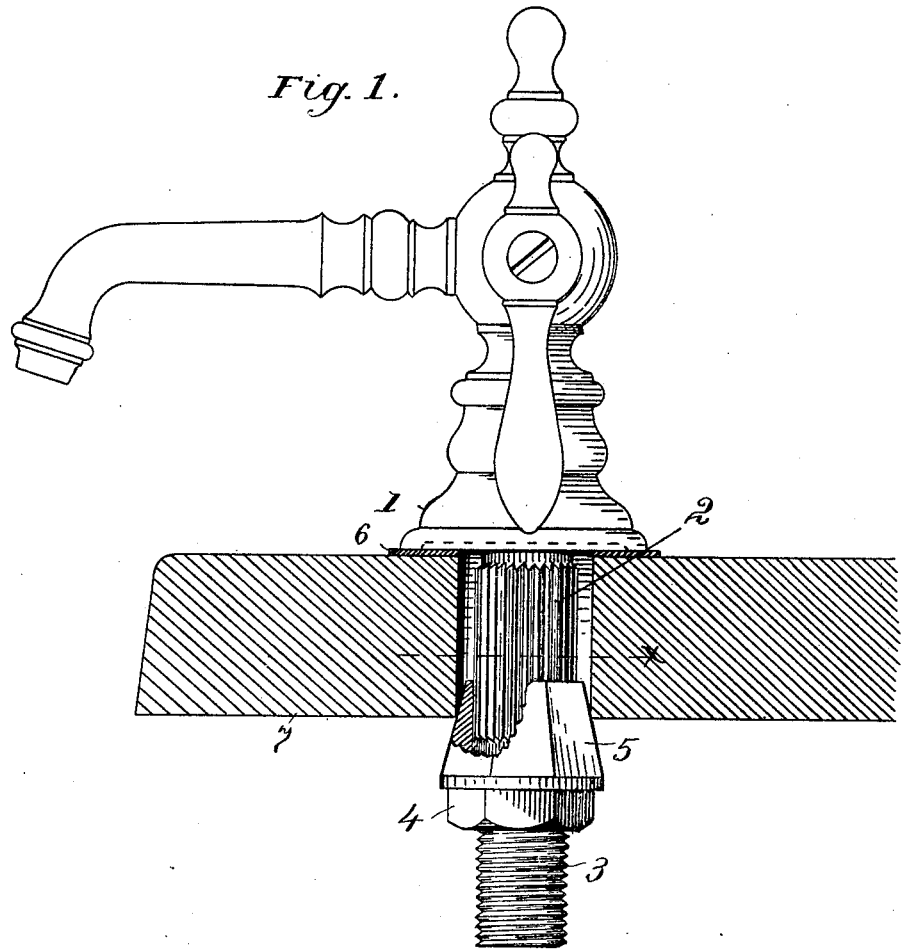
Figure 2:
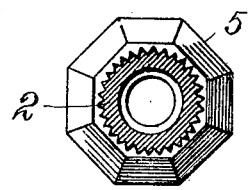

In the drawings forming part of this specification, Figure 1 is an elevation of a basin-cock secured to a slab in accordance with my invention, and Fig. 2 is a diagram of the securing-washer looking downward from section-line X in Fig. 1.

The base of the cock is shown at 1. The part of the cock that extends through the hole of the slab is shown at 2, and the threaded end below the slab is shown at 3. The part 2 is circular in cross-sectional outline, and it is finely fluted or corrugated in the direction of its length. A washer 5 is fluted internally to correspond with the flutings of the part 2 of the cock, and it is preferably made in the form of a frustum of an octagonal pyramid. The threaded end 3 is provided with a nut 4, which is used to force the washer into contact with the slab. A rubber gasket 6 is preferably interposed between the base of the cock and the slab 7; but this feature is not essential to the invention.

In securing the cock to a slab having a square hole the nut and washer are removed, the washer is presented to the hole through the slab from below, the extension of the cock is inserted through the hole and through the washer from above, the washer is placed with some of its plane surfaces bearing against sides of the hole, and the fluted extension is placed in the washer with the spout presented in the proper direction. In case the spout is not properly presented at the first insertion of the fluted extension into the washer the cock is raised until the flutes are clear of the washer, and the spout is turned the distance of a flute or more to get the proper position. After the parts are properly adjusted the nut is screwed to place and the positions are made secure. The shape of the washer precludes possibility of the washer turning in the slab, and the flutes prevent the cock from turning with relation to the washer.

In case of a round or irregularly-shaped hole the salient angles of the washer will find or make depressions sufficient to hold the washer from turning when the nut is properly tightened, and the invention while particularly applicable to square holes may be used under all circumstances encountered in the attachment of basin-cocks to slabs.

The gist of the idea is to provide a washer which will not turn with relation to the slab and to provide for nice adjustment of the cock with relation to the washer, and the various parts may be modified to any extent consistent with this idea without departing from my invention.

The number and size of the flutes may be varied somewhat; but they are properly made large enough to insure sufficient strength and numerous enough to provide sufficiently fine adjustment.

In my application, Serial No. 262,908, filed May 29, 1905, I have described and claimed a basin-cock having a base to sit on the slab, a longitudinally-ribbed extension to pass through the hole of the slab, said extension having a threaded end, a washer conforming to the ribbed extension and having a corrugated or roughened bearing-surface and a nut for the threaded end of the extension. The subject-matter of said application, Serial No. 262,908, is excluded herefrom.

What I claim as new, and desire to secure by Letters Patent, is—

1. In a basin-cock, a base to sit on the slab, a circular fluted extension to pass through a hole in the slab, a threaded end for the fluted extension, a fluted washer adapted to slide on the fluted extension, and a nut for the threaded end.

2. In a basin-cock, a base to sit on the slab, a circular fluted extension to extend through a hole in the slab, a threaded end for the fluted extension, an internally-fluted and externally-tapered washer adapted to slide on the fluted extension, and a nut for the threaded end.

3. In a basin-cock, a base to sit on the slab, a fluted extension to pass through the slab, a threaded end for the fluted extension, an internally-fluted and externally-tapered polygonal washer adapted to slide on the fluted extension, and a nut for the threaded end.

4. In a basin-cock, a base to sit on the slab, a fluted extension to pass through the slab, a threaded end for the fluted extension, an internally-fluted and externally-tapered octagonal washer adapted to slide on the fluted extension, and a nut for the threaded end.

In testimony whereof I sign my name in the presence of two subscribing witnesses.

PHILIP MUELLER.

Witnesses:
ANNA MURPHY,
JOHN L. WADDELL.